United States Patent [19]
Manley

[11] Patent Number: 6,138,455
[45] Date of Patent: Oct. 31, 2000

[54] CLOSELY TEMPERATURE COUPLED MIXING IMPROVING THERMODYNAMIC EFFICIENCY

[76] Inventor: David B. Manley, 11480 Cedar Grove Rd., P.O. Box 1599, Rolla, Md. 65402

[21] Appl. No.: 09/300,670

[22] Filed: Apr. 27, 1999

Related U.S. Application Data

[60] Provisional application No. 60/093,325, Jul. 20, 1998.
[51] Int. Cl.[7] .................................................. F01K 17/00
[52] U.S. Cl. ................................. 60/648; 60/651; 60/671
[58] Field of Search ........................... 60/648, 651, 671; 261/1, 158, 175, 179

[56] References Cited

U.S. PATENT DOCUMENTS

| | | | |
|---|---|---|---|
| 3,505,810 | 4/1970 | Mamiya | ................................. 60/649 X |
| 4,287,138 | 9/1981 | Buckner | ................................. 261/128 |
| 4,333,313 | 6/1982 | Cardone et al. | ........................... 60/649 |
| 4,551,979 | 11/1985 | Wilensky . | |
| 5,102,583 | 4/1992 | Bannon | ................................. 261/114.1 |
| 5,492,409 | 2/1996 | Karlsson et al. . | |
| 5,658,503 | 8/1997 | Johnston et al. . | |

*Primary Examiner*—Hoang Nguyen

[57] ABSTRACT

For the mixing of two streams having substantially different temperatures, a primary object of the present invention is to obtain significantly improved recovery of heating and/or refrigeration values by indirect heat transfer combined with staged heat and mass transfer. The process of the present invention is a fundamental departure from all previous processes of the prior art.

An object of the present invention is to accomplish reverse or "inverse" distillation. While traditional distillation or staged absorption performs simultaneous heat and mass transfer to achieve a separation, the present invention uses that process to mix two feed streams to form a single mixed product stream.

16 Claims, 5 Drawing Sheets

CLOSELY TEMPERATURE COUPLED MIXING IMPROVING THERMODYNAMIC EFFICIENCY

This application is a continuation in part of application Ser. No. 60/093,325 filed Jul. 20, 1998.

FIELD OF THE INVENTION

The present invention relates to reducing lost work in mixing of two or more streams having substantially different temperatures. The invention especially relates to processes whereby significant recovery of heating and/or refrigeration values may be made by indirect heat transfer in the process of staged heat and mass transfer during mixing of two streams having substantially different temperatures.

BACKGROUND OF THE INVENTION

In the chemical process industry process streams are frequently mixed prior to reacting or shipment off site. The mixing process normally consists of simply combining the streams in a pipeline junction or tank. If the streams are of substantially different temperature, this simple process is highly irreversible thermodynamically, and considerable entropy production (lost work) occurs. In practical terms this means that an opportunity to pump heat to a higher temperature or to convert heat into work has been forever lost.

Some prior art is available concerning stream mixing prior to reaction. In U.S. Pat. No. 4,345,915, a process is described for improving water vaporization into a reactant gas stream. Thus is described as to the preparation of the gaseous reactant feed to undergo a chemical reaction requiring the presence of steam, the efficiency of overall power utilization is improved by premixing the gaseous reactant feed with water and then heating to evaporate the water in the presence of the gaseous reactant feed, the heating fluid utilized being at a temperature below the boiling point of water at the pressure in the volume where the evaporation occurs.

A direct heat transfer from a low grade heat medium is described in U.S. Pat. No. 4,072,625. In a process of reacting a hydrocarbon with steam and/or carbon dioxide in a reaction zone heated by a combustion furnace to give olefins or process gas containing carbon oxides and hydrogen high grade heat is recovered from furnace flue gases and/or process gas whereby to cool such gases to 150–300.degree. C. When the process gas is used in a synthesis of for example methanol or ammonia, gases at 150.degree.–300.degree. C are also produced. Previously the recovery of heat from such low grade heat sources has been inefficient or inconvenient. According to the invention the heat is recovered by means of an intermediary liquid coolant, which is brought into direct heat exchange with streams to be used in the process. Preferably the liquid is water under pressure and is brought into direct heat exchange with a gas to be fed to the process; by this means 10–30% of the steam can be provided from low grade waste heat.

The skilled persons in the art of mixing streams appear to focus on achieving uniform mixing instead of reducing lost work. An example of such focus in U.S. Pat. No. 5,658,503, wherein a device is provided for mixing two fluids, one a liquid, the other a gas, where apertures are provided in channel tubes to mix the fluids in the individual channels. The mixing device provides a two fluid admixture for passage to downstream processing, most preferably the tubeside of a shell and tube heat exchanger. The apparatus provides uniform distribution of gas and liquid to all parallel channels. Another such example is found in U.S. Pat. No. 5,492,409 "Device for mixing two fluids having different temperature", which describes a device for mixing two fluids having different temperatures having a connecting branch extending into a main pipe from a secondary pipe, said connecting branch having at its end positioned in the main pipe a distribution casing with double annular walls, of which an inner wall defines a channel extending axially and centrally in the main pipe, and having apertures which allow a fluid to be conducted into and mixed with the fluid passing through the main pipe. The apertures consist of a plurality of small apertures which are formed in the inner wall of the distribution casing and provide intermixing of the two fluids directly in the channel positioned centrally in the main pipe.

Tangentially, thermodynamic efficiency has been discussed with reference to distillation in U.S. Pat. No. 4,551,979 "Method and apparatus for a thermodynamic cycle by use of distillation". In that patent, a working fluid in the gaseous state at some initial temperature and pressure is expanded polytropically to a resulting exhaust fluid having some lower temperature and pressure in order to produce useful work. Large quantities of a motive liquid are then employed as the vehicle for approximating an isenthalpic compression of the working fluid. The preferred method for effecting this recompression is to reduce both fluids to a single liquid phase which is then energized. Thereafter the two fluids can be reconstituted to their initial states to complete the thermodynamic cycle which, depending upon the fluids selected, can be located in a broad range of the temperature spectrum.

SUMMARY OF THE INVENTION

For the mixing of two streams having substantially different temperatures and components of different boiling temperatures, a primary object of the present invention is to obtain significantly improved recovery of heating and/or refrigeration values by indirect heat transfer combined with staged heat and mass transfer. The process of the present invention is a fundamental departure from all previous processes of the prior art.

An object of the present invention is to accomplish reverse or "inverse" distillation. While traditional distillation or staged absorption performs simultaneous heat and mass transfer to achieve a separation, the present invention uses that process to mix two feed streams to form a single mixed product stream.

As used herein unless otherwise referring to a prior method of separation by distillation using stripping or rectification stages, the terms "stripping" and "rectification" will refer to, respectively, the invention processes of "inverse stripping" and "inverse rectification". In the process of "inverse rectification", a lighter average molecular weight vapor is condensed in a heavier average molecular weight liquid. In the process of "inverse stripping" a heavier average molecular weight liquid is vaporized into a lighter average molecular weight vapor. The prior art has never contemplated nor proposed a benefit for such processes. The combination of "inverse rectification" and "inverse stripping" having intervening between them a liquid/vapor contact stage contacting the vapor from the top stage of the stripping stages and the liquid of the bottom stage of the rectification stages defines the additional invention process of "inverse distillation".

In a first embodiment of inverse distillation, a feed liquid stream is fed to a condenser with a vapor stream from a top stage of a set of rectification stages, whereafter the substantially or fully condensed liquid stream from the condenser is fed to the top stage of the rectification stages. To a bottom stage of a set of reboiled stripping stages is fed a feed vapor stream. The rectification and stripping sections are in fluid connection with each other via an intermediate stage wherein are contacted a liquid stream from a bottom stage of the rectification stages and a vapor stream from a top stage of the stripping stages, thereby bringing substantially to equilibrium the vapor immediately above the intermediate stage and the liquid on the intermediate stage.

In this first embodiment, a product vapor stream is withdrawn from the intermediate stage. A product liquid stream is withdrawn from the intermediate stage. Liquid fed to the reboiler reboiling the stripping stages comprises absorbed feed vapor components. Vapor combined with the feed liquid stream to the condenser providing refrigeration to the rectification stages comprises vaporized components of the feed liquid stream which have risen through the rectification stages. The presence of these several components in the condenser and reboiler significantly alter the character of heat transfer to and from the invention mixing process streams. For this first embodiment, the vaporization and condensation curves of, respectively, the process streams of the inverse distillation passing through the reboiler and condenser are unexpectedly compressed within relatively narrow temperature ranges widely separated from each other.

In the prior art, mixing of two feed streams with substantially different temperatures to form a single product stream with an intermediate temperature has been done whereby the heating and cooling values of those feed streams was recovered in part by indirect heat transfer. This indirect heat transfer caused the temperatures of the feed streams to become approximately that had the two feed streams been mixed without such indirect heat transfer. The skilled person will instantly appreciate that the heat sink and heat source used for indirect heat transfer with the feed streams, typically some countercurrent flowing fluid, must have substantial overlap in their temperatures at the point of their heat transfer with their respective feed streams at the outlets of the indirect heat transfer devices. With such an inefficient result, the skilled person would not to attempt to bring the temperatures of two feed streams any closer than the sum of the requisite temperature differences between the two heat transfer fluids and their respective outlet temperatures of the feed streams from the indirect heat transfer devices.

The first embodiment of the present invention provides dramatic change to such a limitation in the prior art. The vapor and liquid product streams withdrawn from the intermediate stage defining the break between the rectification and stripping stages necessarily have about the same temperature and thereafter may be combined with a substantial improvement in thermodynamic efficiency the just described prior art process.

In all the embodiments of the present invention, the sum of moles of components withdrawn in product vapor and liquid streams consist of all the moles of components of the combination of feed liquid and vapor streams. This distinguishes the process of the present invention from the prior art methods of separation via distillation, stripping, rectification or absorption. The process of the present invention is one of stream mixing, not separation.

In another embodiment of the present invention, the condenser and at least some of the top stages of the rectification section of the first embodiment are replaced with a first dephlegmator using a single or multiple heat transfer fluids. In addition, the reboiler and at least some of the bottom stages of the stripping section of the first embodiment are replaced with a second dephlegmator using a single or multiple heat transfer fluids. The feed liquid stream is distributed to top process fluid openings of the first dephlegmator. The feed vapor stream is distributed to the bottom fluid openings of the second dephlegmator. In a sub-embodiment of this second embodiment, the first and second dephlegmators replace the condenser, reboiler and all the stages of the first embodiment. Product vapor and liquid streams are withdrawn as in the first embodiment between the rectification and stripping stages at an intermediate stage, whether such stages are liquid and vapor contacting means separate from indirect heat transfer surfaces or heat transfer surfaces integral with the vapor and liquid contacting means.

In yet another embodiment of the present invention, an excess vapor stream is withdrawn from liquid and vapor separation means at the outlet of the condenser or withdrawn from a vapor collection space above the top process fluid openings of the first dephlegmator. The excess vapor stream is vapor introduced to the bottom stages of the rectification stages and/or the bottom process fluid openings of the first dephlegmator in excess of that which will be condensed in the condenser or the first dephlegmator. This excess vapor stream is combined with the vapor product stream and is intended to be of relatively small flow compared to the vapor product stream withdrawn between the rectification and stripping stages or dephlegmators.

In yet another embodiment of the present invention, an excess liquid stream is withdrawn from liquid collection means below the bottom stage of the stripping stages or withdrawn from similar liquid collection means below the bottom process fluid openings of the second dephlegmator. The excess liquid stream is liquid introduced to the top stages of the stripping stages and/or the top process fluid openings of the second dephlegmator in excess of that which will be vaporized in the reboiler or the second dephlegmator. This excess liquid stream is combined with the liquid product stream and is intended to be of relatively small flow compared to the liquid product stream withdrawn between the rectification and stripping stages or dephlegmators.

In a broader embodiment of the present invention providing an isolated set of stripping stages and appropriate heat transfer means as described above for the stripping stages, a feed vapor stream is fed to a bottom stage of stripping stages reboiled with a single reboiler or more continuous reboiling means such as interreboilers or a reboiling dephlegmator (which incorporates stripping stages). A conditioned feed liquid stream is fed to the top of the stripping stages so to countercurrently contact the feed vapor stream and be substantially completely vaporized. The conditioned feed liquid stream preferably has a component composition substantially in equilibrium with a vapor product stream emerging from the top stage of the stripping stages. Such equilibrium provides the greatest benefit through the objects of the present invention, although continuously reduced benefit may be obtained by changing the composition of the conditioned feed liquid stream such that it comprises almost none of the components of the feed vapor stream, i.e., comprises substantially only components with significantly higher boiling temperatures than the major components of the feed vapor stream.

In yet another broader embodiment of the present invention providing an isolated set of rectification stages and appropriate heat transfer means as described above for the rectification stages, a feed liquid stream is fed to a condenser with a vapor stream from a top stage of a set of rectification stages or to the top fluid openings of a rectifying dephlegmator as described above. A conditioned feed vapor stream is fed to a lowest of the rectification stages so to countercurrently contact the feed liquid stream and be substantially completely condensed and absorbed in a liquid phase. The conditioned feed vapor stream preferably has a component composition substantially in equilibrium with a liquid product stream emerging from the lowest stage of the rectification stages. Such equilibrium provides the greatest benefit through the objects of the present invention, although continuously reduced benefit may be obtained by changing the composition of the conditioned feed vapor stream such that it comprises almost none of the components of the feed liquid stream, i.e., comprises substantially only components with significantly lower boiling temperatures than the major components of the feed vapor stream.

DETAILED DESCRIPTION OF THE INVENTION

As described above, the present invention permits recovery of heating and/or refrigerative values from two streams to be mixed, each having a substantially different temperature prior to mixing. Also as described above, there is provided in the process of the present invention indirect heat transfer comprising heating of the cooler feed stream and cooling of the hotter feed stream. In the specific example below, it is seen that the heating of the vapor feed stream is made across a temperature range in which refrigerative values may be recovered to other process or utility streams below the range in which cooling water is typically available for such cooling, i.e., the range in which compression power must be used for a refrigeration loop for such cooling.

The first embodiment of the present invention provides a method for compressing the temperature range in which the refrigerative values are recovered from the reboiler by reboiling the liquid stream from the bottom stage of the stripping section, albeit with reduced refrigerative duty recovery as compared with the second embodiment. In the second embodiment of the present invention, the stripping dephlegmator recovers refrigerative values across a wider range of temperatures at about five times the refrigerative duty recovery from operation of the stripping stages in the stripping dephlegmator as compared with the operation of the reboiler and stripping stages of the first embodiment. Within the temperature ranges in which the reboiled stream of the first embodiment is heated (i.e., refrigerative duty recovered), the stripping dephlegmator of the second embodiment recovers roughly 70% higher refrigerative duty.

The present invention is now discussed with reference to the Figures and Tables 1–5 below.

Figure 1:
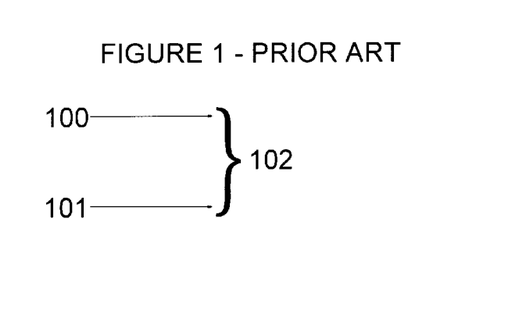
FIG. 1 is a prior art simple mixing of two streams.

FIG. 1 shows a representative pipeline junction two process streams are mixed with equal pressures and equal volumetric flow rates. The stream compositions are chosen to be isobutane at its bubble point (liquid feed stream 100) and propylene at its dew point (vapor feed stream 101). These components are typical of feedstocks for a refining process for the production of alkylate gasoline, and the conditions are chosen to isolate the comparisons of the conventional and thermodynamically efficient processes from extraneous considerations. Extraneous considerations include variations of flow rates, pressures and temperatures which are part of the teaching of the prior art for such a process. The skilled person is informed by the disclosure of the present invention of the broad applicability of the present embodiments of the present invention to virtually all similar mixing circumstances as described herein.

As to FIG. 1, Table 1 gives the conditions of the feed streams and the resulting mixture (mixed product stream 102). The isobutane liquid feed stream 100 and propylene vapor feed stream 101 prior to mixing have temperatures 100° F. and 23° F. respectively. The mixed product stream 102 has a resulting mixed stream temperature of 62° F. The temperature mismatch of the two feed streams in the process of this FIG. 1 necessarily generates wasteful entropy production which according to the methods of the prior art, as shown in FIG. 2 and 2A, are uneconomically and incompletely preventable.

Figure 2:
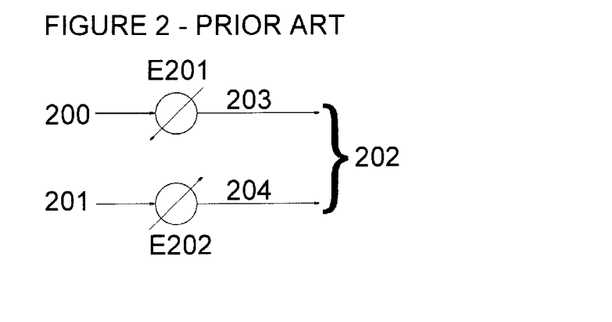
FIG. 2 is a prior art method of recovering heating and refrigeration values from two streams of substantially different temperatures before mixing to form a mixed stream.
Figure 2A:
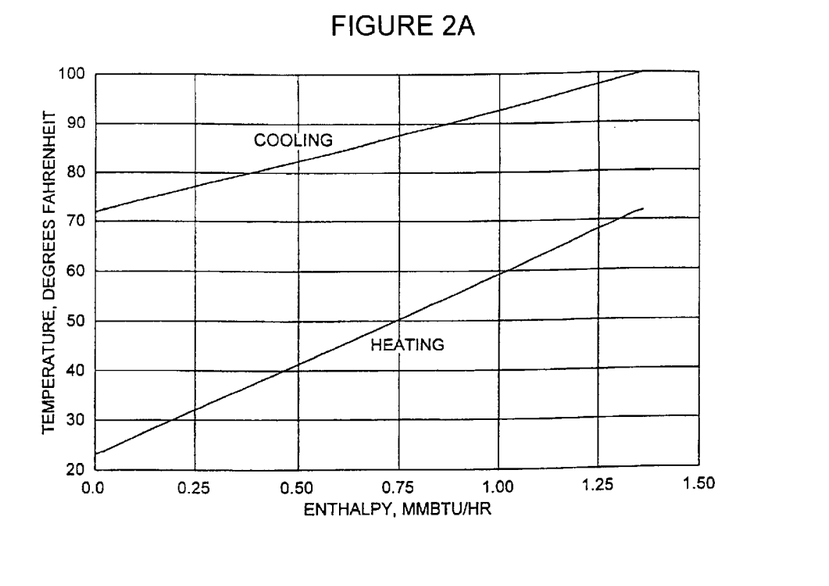
FIG. 2A shows a heating curve for the process stream heated in exchanger E202 and a cooling curve for the process stream cooled in exchanger E201 of the process of FIG. 2.

FIG. 2A shows a more thermodynamically efficient mixing process using indirect heat exchange to bring each of the two feed streams to a temperature of 72° F. prior to mixing. The liquid feed stream 200 is cooled in exchanger E201 by a cooling duty equal to a heating duty of vapor feed stream 201 added to that stream in exchanger E202. Afterward the heat transfer in exchangers E201 and E202, streams 200 and 201 are mixed to form mixed product steam 202 with a mixed product stream temperature of about 62° F.

As shown in Table 2, the process of FIGS. 2 and 2A results in the same mixed product stream as to composition and conditions (temperature, pressure, phase, etc.) as the process of FIG. 1. Composite heating (for stream 201) and cooling (for stream 200) curves for the conventional mixing process with heat exchange are given in FIG. 2A. Approximately 1.35 MMBtu/Hr of heat is absorbed at low temperature and rejected at high temperature with a minimum temperature difference of about 28° F. This heat pumping could be used elsewhere at the site to reduce energy consumption, but the small amount of energy and small temperature difference would make it impractical. Consequently, the thermodynamic irreversibility of conventional mixing is usually accepted as being unavoidable. The recovery of the refrigerative duty of the vapor cooling of stream 201 is small and spans a relatively broad temperature range, giving little incentive for its recovery.

First Embodiment of the Present Invention

Figure 3:
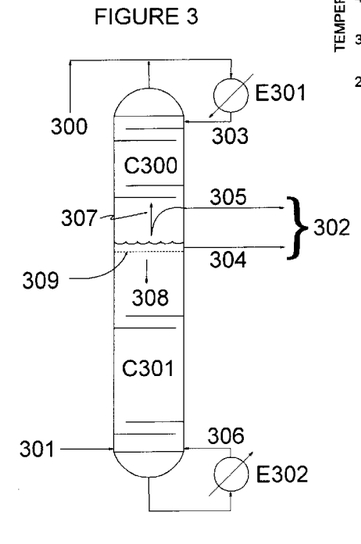
FIG. 3 shows the invention inverse distillation with a condenser and reboiler at, respectively, above the top stage of the rectification stages and below the bottom stage of the stripping stages.

The unit operation of distillation, which is used industrially to separate mixtures into two or more streams of different composition, may be inventively designed to approach thermodynamic reversibility closely. This suggests to the present inventor that a process similar to distillation may be used to mix streams in a thermodynamically efficient manner. Such an "inverse distillation" process is shown in FIG. 3 for the mixing of the isobutane and propylene streams discussed above, and stream conditions are given in Table 3.

For the purpose of comparison of the prior art and invention methods, the liquid feed streams 100, 200, 300, and 400 are of substantially the same composition and conditions. In addition, vapor feed streams 101, 201, 301 and 401 are likewise of substantially the same composition and conditions. Finally, mixed product streams 102, 202, 302 and 402 are likewise of substantially the same composition and conditions.

In the inverse distillation process the saturated liquid isobutane (stream 300) is fed into the condenser E301 distillation column section C300, comprising rectification stages producing a top stage vapor stream mixed with stream 300 before it is fed to condenser E301. The saturated vapor propylene (stream 301) is fed to the bottom stage of stripping stages in distillation column section C301.

Figure 5:
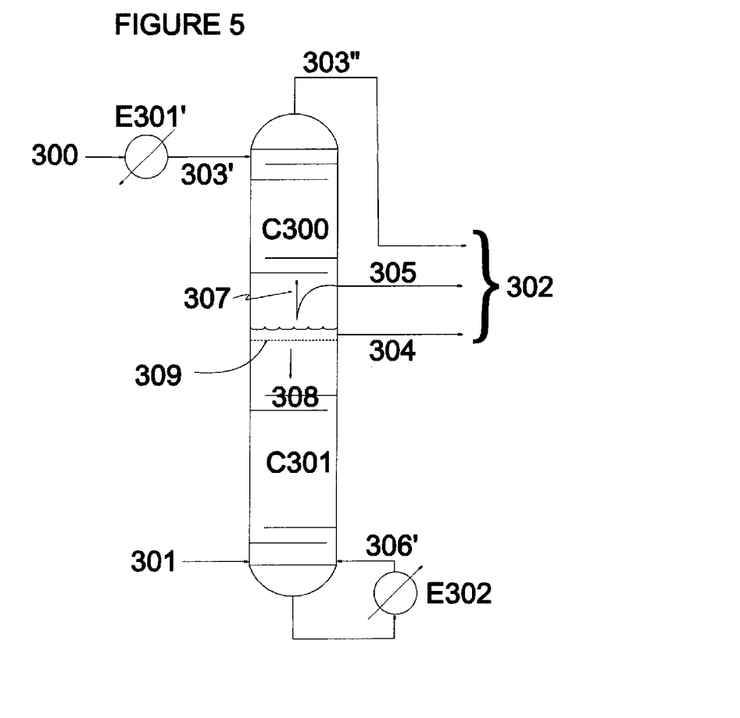
FIGS. 5 and 6 are alternate embodiments of the processes shown respectively in FIGS. 3 and 4.

Condenser E301 operates to cool and optionally totally condense stream 300 and a vapor stream from the top stage of the rectification stages. The rectification stages have fed to their lowest stage vapor stream 307, which is a portion of the vapor from an intermediate stage 309. An alternate sub-embodiment of this method provides that not all the vapor from the top stage of the rectification stages is condensed, such vapor being separated from the liquid from exchanger E301 and such excess vapor being combined later to form part of mixed product stream 302, although slightly changing the operation of the first embodiment. Such excess vapor may be produced by requirements for having excess vapor fed to the bottom rectification stage for control purposes. In yet another subembodiment, FIG. 5 shows only stream 300 cooled in exchanger E301 and the vapor stream 303" being recovered from the top rectification stage for combination with streams 304' and 305' to form the mixed product stream 302.

Reboiler E302 operates to heat stream 301 and optionally totally vaporize the liquid from the bottom stripping stage of column section C301, such vaporized stream forming stream 306 to provide stripping duty to the stripping stages.

Vapor product stream 305 and vapor stream 307 are the vapor from the intermediate stage 309. Liquid product stream 304 and liquid stream 308 are the intermediate stage 309. Vapor product stream 304 and liquid product stream 305 are withdrawn the intermediate stage 309. More broadly, these product streams may be withdrawn as sidedraw products taken from a central tray in a single unpartitioned column, whereby the sidedraw tray defines the boundary between the inverse distillation stripping and rectification stages. Therefore, although in the stripping and rectification stages the majority of the flows of the feed streams do not contact one another, it is intended that the intermediate stage 309 provide for a single equilibrium stage through which pass substantially all the components of the feed streams in liquid/vapor contact. After product stream withdrawal, streams 304 and 305 may be combined to form mixed product stream 302. Heat is rejected in the condenser exchanger E301 at high temperature and is absorbed in the reboiler exchanger E302 at low temperature.

Figure 3A:
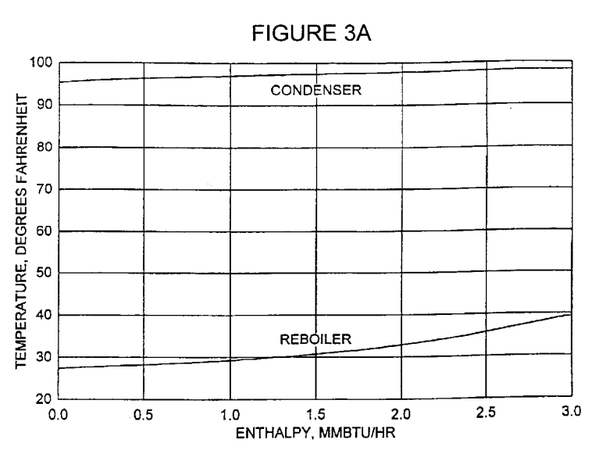
FIG. 3A shows a heating curve for the process stream heated in exchanger E302 and a cooling curve for the process stream cooled in exchanger E301 of the process of FIG. 3.
Figure 3B:
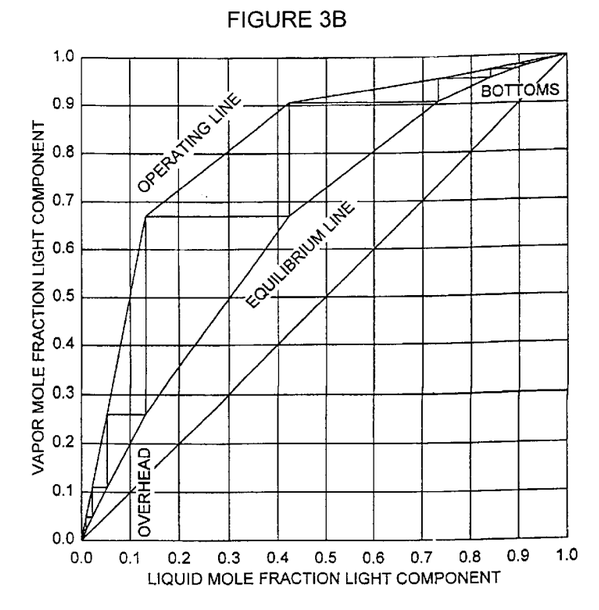
FIG. 3B shows a McCabe-Thiele diagram for the rectification and stripping stages of the inverse distillation of the process of FIG. 3.

The skilled person in the art of component separation by distillation will immediately be surprised that using a reversed distillation process as just described results in any benefit at all. It is shown in FIG. 3B that the McCabe-Thiele diagram for the process of inverse distillation process comprises an operating line lying above and to the left of the equilibrium line rather than below and to the right as in a conventional, "forward" distillation process. Also in contrast with conventional distillation, in the inverse distillation process the bottom of the column is rich in the light component and the top of the column is rich in the heavy component. The equilibrium stages stepped off in FIG. 3B show that the inverse distillation process "pinches" at the top and bottom rather than in the middle as in conventional distillation. Even the disclosure of the FIG. 3B to the skilled person does not immediately give rise to an expectation of a benefit from such operation.

However, the following is a description of the dramatic improvement in recovery of heating and/or refrigerative values from streams to be mixed as described herein. Composite heating (in reboiler E302 for stream 306) and cooling (in condenser E301 for stream 303) curves for the inverse distillation process are given in FIG. 3A. Approximately, 3.0 MMBtu/Hr is absorbed at low temperature and rejected at high temperature with a minimum temperature difference of about 59° F. This heat pumping becomes instantly more economically attractive than of the process of FIGS. 2 and 2A by the conventional mixing process with heat exchange. There is clearly greater thermodynamic efficiency of the inverse distillation process of the present invention.

Thus, it may be appreciated that about 3.0 MMBtu/Hr of refrigerative duty may be recovered from exchanger E302 within the narrow temperature range of about 23° F. to 39° F. plus economically requisite temperature differences appropriate to the process or utility to which the refrigerative value will be transferred. The utility cost of this refrigerative value is the condensing duty of condenser E301 at a relatively high temperature range of from about 95° F. to 98° F.

Double Dephlegmator Process

Figure 4:
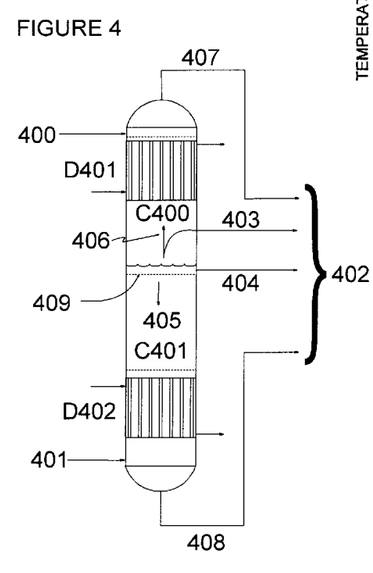
FIG. 4 shows the invention inverse distillation with a rectifying dephlegmator receiving the feed liquid stream at top process fluid openings and also a stripping dephlegmator receiving the feed vapor stream at bottom process fluid openings.
Figure 4A:
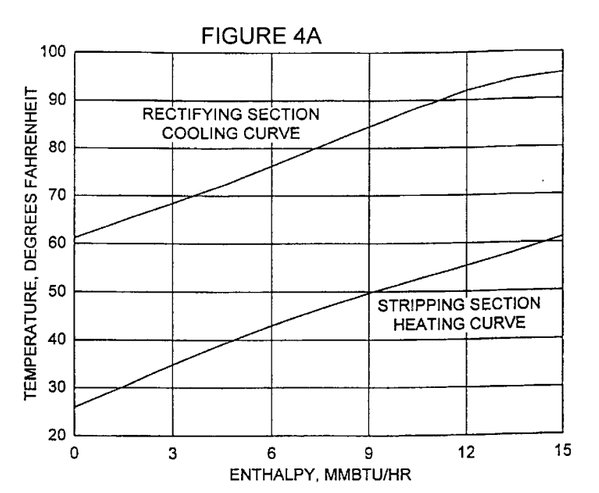
FIG. 4A shows a heating curve for the process stream heated in stripping dephlegmator D402 and a cooling curve for the process stream cooled in rectifying dephlegmator D401 of the process of FIG. 4.
Figure 4B:
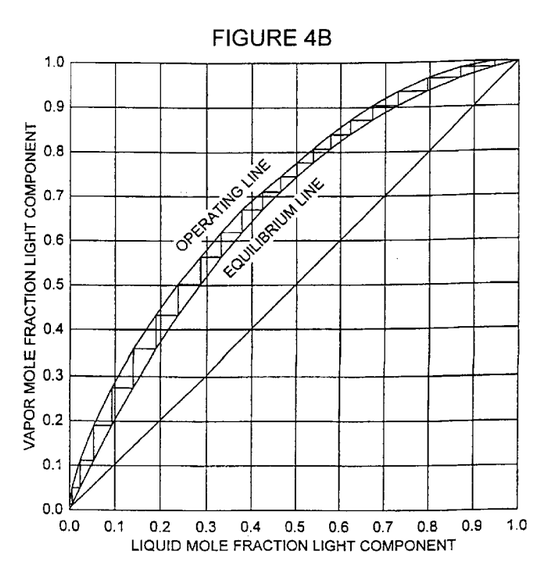
FIG. 4B shows a McCabe-Thiele diagram for the rectification and stripping dephlegmators of the inverse distillation of the process of FIG. 4.

However, to the present inventor, the McCabe-Thiele diagram in FIG. 3B indicates that the thermodynamic efficiency could be even higher if the operating line were brought closer to the equilibrium line through the use of interexchange of heat from the rectification section stages and to the stripping section stages. This may be accomplished by using dephlegmators or the equivalent of such process, whereby substantially concurrent heat and mass transfer occur across a temperature range at the heat transfer surface or surfaces. Dephlegmators combine heat exchange with distillation, and are used commonly in industry. A "double dephlegmator" process for inverse distillation mixing of the isobutane and propylene feed streams is shown in FIGS. 4, 4A and 4B. The stream conditions are shown in Table 4.

Figure 6:
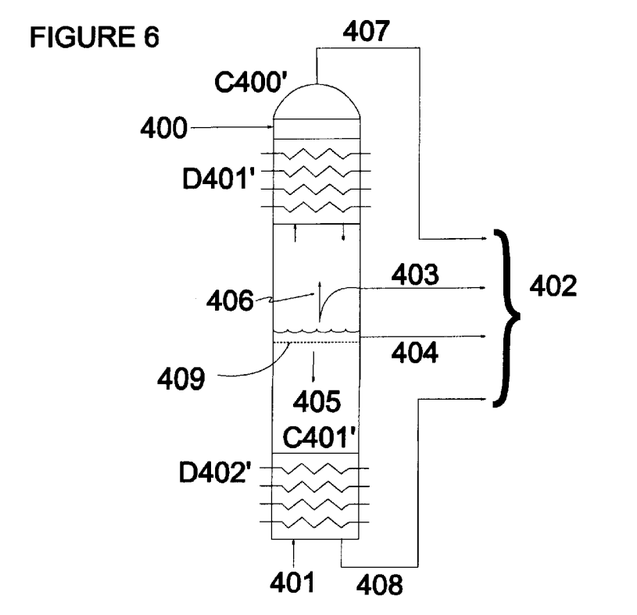

In the double dephlegmator process, stream 400 is distributed and fed into the top fluid openings of the rectification dephlegmator D401. Stream 401 is distributed and fed into the bottom fluid openings of the stripping dephlegmator D402. Dephlegmators may be heated or cooled with one heat transfer fluid as shown in FIG. 4 or several as shown in FIG. 6. It is intended that the dephlegmator operation described herein include heat transfer sufficient to accomplish the objects of the invention such that the specific heat transfer fluids or their conditions used in the dephlegmators are not a limitation to the broad application of the present invention.

Dephlegmator D401 operates to cool and concurrently provide a number of rectification stages within column section C400 for the counter current contact of stream 400 and vapor stream 406, which enters dephlegmator D401 at its bottom fluid openings. In one preferred sub-embodiment of this second embodiment, no vapor stream is emitted to the upper vapor collection section of column C400 from the top or upper fluid openings of dephlegmator D401. Optionally, primarily for control purposes, some small amount of excess vapor may escape condensation or absorption into the liquid phase within dephlegmator D401 into the upper vapor collection section of column C400 from the top or upper fluid openings of dephlegmator D401, as stream 407. Stream 407 is subsequently mixed with streams 403 and 404 to form stream 402.

Dephlegmator D402 operates to heat and concurrently provide a number of stripping stages within column section C401 for the counter current contact of stream 401 and liquid stream 405, which enters dephlegmator D402 at its top fluid openings. In one preferred sub-embodiment of this second embodiment, no liquid stream is emitted from the bottom liquid collection section of column C401 from the bottom fluid openings of dephlegmator D402. Optionally, primarily for control purposes, some small amount of excess liquid may escape vaporization into the vapor phase within dephlegmator D402 into the lower liquid collection section of column C401 from the bottom fluid openings of dephlegmator D402, as stream 408. Stream 408 is subsequently mixed with streams 403 and 404 to form stream 402.

As required in the first embodiment an intermediate stage 409 of FIG. 4 operates similar to stage 309 of FIG. 3, whereby, for the process of FIG. 4, in the stripping and rectifying dephlegmators the majority of the flows of the feed streams do not contact one another. It is rather intended that the intermediate stage 409 provide for a single equilibrium stage through which pass substantially all the components of the feed streams in liquid/vapor contact.

Stream 403 is withdrawn as a portion of the vapor the intermediate stage 409, the other portion being fed to column section C400 as vapor stream 406. Stream 404 is withdrawn as a portion of the liquid from the intermediate stage 409, the other portion being fed to column section C401 as liquid stream 405.

Similar to the first embodiment, heat is rejected in the dephlegmator D401 at high temperature and absorbed in the dephlegmator D402 at low temperature. FIG. 4B shows a McCabe-Thiele diagram for the double dephlegmator process which is similar to the diagram for the inverse distillation process of the first embodiment except that the operating line is more uniformly distant from the equilibrium line. The substantially concurrent heat and mass transfer of the dephlegmator process reduces pinches inherent in the inverse distillation process of the first embodiment and makes the double dephlegmator process of the second embodiment more thermodynamically efficient. About twice as many equilibrium stages, totaling stages for stripping and rectification, are used in the double dephlegmator process of the second embodiment (about 22 stages) than are used in the inverse distillation process of the first embodiment (about 10 stages).

Composite heating (as to the vapor and liquid in dephlegmator D402) and cooling (as to the vapor and liquid in dephlegmator D401) curves for the double dephlegmator process are given in FIG. 4A. Approximately, 15.0 MMBtu/Hr is absorbed at low temperature and rejected at high temperature with a minimum temperature difference of about 35° F. In terms of total duty available for refrigerative recovery dephlegmator D402, the duty of 15 MMBtu/Hr is more heat pumping that in the inverse distillation process of the first embodiment and over ten times as much heat pumping as accomplished by the conventional process. Significantly more heat pumping may be accomplished by incorporating more equilibrium stages in the dephlegmators and by achieving an even closer approach to thermodynamic reversibility.

As to the recovery of refrigerative values from the heat transfer of dephlegmator D402, it will be seen that at least some portion of the cooling of dephlegmator D401 is likely to require refrigeration utilities other than cooling water. These utilities may be provided at a higher temperature than the recovered refrigerative duty from dephlegmator D402 and thus provide an economic incentive to apply the present invention for such recovery.

Single Section Process

Figure 7:
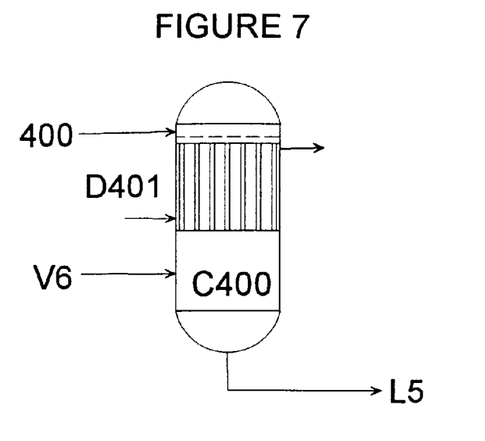
FIG. 7 is an embodiment of the present invention whereby only a rectification section is used for the mixing operation of the present invention.
Figure 8:
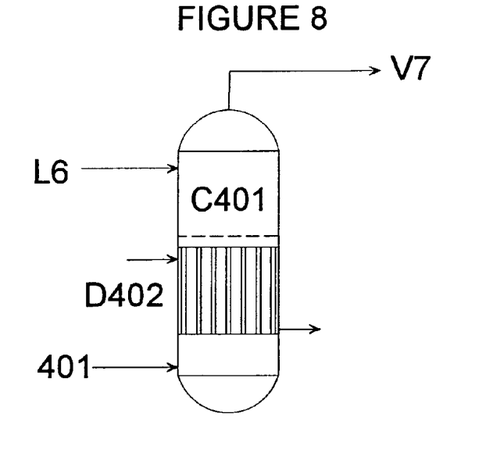
FIG. 8 is an embodiment of the present invention whereby only a stripping section is used for the mixing operation of the present invention.

As shown in FIGS. 7 and 8, the stream compositions and conditions of which are shown in Tables 4 and 5, the present invention comprises isolated used of the stripping and rectification stages, and their appropriate heat transfer means, as separate devices to accomplish mixing of two streams with recovery of heating or refrigerative values.

In FIG. 7 is shown column section C400 operating in a manner similar to that of the process of FIG. 4. Stripping dephlegmator D401 receives feed liquid stream 400 to its upper fluid openings and conditioned feed vapor stream V6 to its bottom fluid openings. A single liquid product stream L5 emerges from the bottom fluid openings of stripping dephlegmator D401 consisting of all the components of streams 400 and V6. The recovery of heating values or requirement for cooling is similar to that of the process of FIG. 4 for the stripping dephlegmator stages. A similar result occurs for the use of rectification stages receiving refrigeration from a condenser as in the process of FIG. 3. The conditioned feed vapor stream V6 is fed to the bottom of the rectification stages so to countercurrently contact the feed liquid stream 400 and be substantially completely condensed or absorbed. As informed by the information of Table 5, the conditioned feed vapor stream L6 has a component composition substantially in equilibrium with a liquid product stream emerging from the bottom fluid openings of the dephlegmator D401. Such equilibrium provides the greatest benefit through the objects of the present invention, although continuously reduced benefit may be obtained by changing the composition of the conditioned feed liquid stream L6 such that it comprises lesser relative amounts of isobutane.

In FIG. 8 is shown column section C401 operating in a manner similar to that of the process of FIG. 4. Stripping dephlegmator D402 receives feed vapor stream 401 to its lower fluid openings and conditioned feed liquid stream L6 to its top fluid openings. A single vapor product stream V7 emerges from the top fluid openings of stripping dephlegmator D402 consisting of all the components of streams 401 and L6. The recovery of refrigerative values is similar to that of the process of FIG. 4 for the stripping dephlegmator stages. A similar result occurs for the use of stripping stages reboiled by a reboiler as in the process of FIG. 3. The conditioned feed liquid stream L6 is fed to the top of the stripping stages so to countercurrently contact the feed vapor stream 401 and be substantially completely vaporized. As informed by the information of Table 5, the conditioned feed liquid stream V6 has a component composition substantially in equilibrium with a vapor product stream emerging from the top fluid openings of the dephlegmator D402. Such equilibrium provides the greatest benefit through the objects of the present invention, although continuously reduced benefit may be obtained by changing the composition of the conditioned feed liquid stream V6 such that it comprises lesser relative amounts of propene.

Thermodynamically efficient mixing will be of greatest economic value in refrigerated processes where it will reduce or eliminate the high cost of compressors and associated refrigeration process equipment. For example, in ethylene manufacture byproduct propylene must be separated from ethane and propane for sale. The ethane and propane, which are recycled to the pyrolysis reactors, may then be mixed to produce refrigeration which may be used economically in the ethylene recovery process. Alternatively, thermodynamically efficient mixing for an above ambient temperature process may be deliberately accomplished at subambient temperatures to create refrigeration for use in another nearby process.

Thermodynamically efficient mixing will also be of value in absorption processes where a heavy solvent such as a lean oil is use to absorb light components from gases. Example processes are natural gas liquids recovery (gas processing), ethylene recovery (petrochemical processing), and FCC vapor recovery (refining).

In general, the greater the boiling point difference of the components mixed, the greater the temperature range over which heat may be pumped, but the less heat which may be pumped. Mixing of benzene and propylene for cumene manufacture, for example, would pump over a greater temperature difference but would pump less heat than the examples using isobutane and propylene described above.

The embodiments of the present invention may be applied for mixing of multicomponent streams. It is preferred that feed liquid streams comprise a major amount of a component with the highest boiling temperature of the liquid components and that the feed vapor streams comprise a major amount of a component with the lowest boiling point of the vapor components. With the present disclosure, the difference in boiling temperatures of the major components of the feed vapor and liquid streams provides the skilled person with direction to anticipate the sort of significant benefit obtained by practicing mixing multicomponent streams by way of the present invention.

The above design disclosures present the skilled person with considerable and wide ranges from which to choose appropriate obvious modifications for the above examples. However, the objects of the present invention will still be obtained by the skilled person applying such design disclosures in an appropriate manner.

TABLE 1

|  | Stream | | |
| --- | --- | --- | --- |
|  | 100 | 101 | 102 |
| Vap. Frac. | 0 | 1 | 0.5599 |
| Degrees F. | 100 | 23.1 | 62 |
| Psia | 72.2 | 72.2 | 71.1 |
| Lbmole/hr | 1,412 | 1,808 | 3,220 |
| Mlb/hr | 82.07 | 76.08 | 158.15 |
| Barrel/day | 10,000 | 10,000 | 20,000 |
| Vol. Frac. | | | |
| Propene | 0 | 1 | 0.5 |
| Isobutane | 1 | 0 | 0.5 |

TABLE 2

|  | Stream | | | | |
| --- | --- | --- | --- | --- | --- |
|  | 200 | 201 | 202 | 203 | 204 |
| Vap. Frac. | 0 | 1 | 0.5599 | 0 | 1 |
| Degrees F. | 100 | 23.1 | 62 | 71.8 | 71.8 |
| Psia | 72.2 | 72.2 | 71.1 | 71.1 | 71.1 |
| Lbmole/hr | 1,412 | 1,808 | 3,220 | 1,412 | 1,808 |
| Mlb/hr | 82.07 | 76.08 | 158.15 | 82.07 | 76.08 |
| Barrel/day | 10,000 | 10,000 | 20,000 | 10,000 | 10,000 |
| Vol. Frac. | | | | | |
| Propene | 0 | 1 | 0.5 | 0 | 1 |
| Isobutane | 1 | 0 | 0.5 | 1 | 0 |

TABLE 3

|  | Stream | | | | | | |
| --- | --- | --- | --- | --- | --- | --- | --- |
|  | 300 | 301 | 302 | 303 | 304 | 305 | 306 |
| Vap. Frac. | 0 | 1 | 0.5599 | 0 | 1 | 0 | 1 |
| Degrees F. | 100 | 23.1 | 62 | 95.4 | 62 | 62 | 39.3 |
| Psia | 72.2 | 72.2 | 71.1 | 67.7 | 71.1 | 71.1 | 72.01 |
| Lbmole/hr | 1,412 | 1,808 | 3,220 | 1,758 | 1,803 | 1,417 | 406 |
| Mlb/hr | 82.07 | 76.08 | 158.15 | 102.04 | 85,421 | 72.73 | 17.6 |
| Barrel/day | 10,000 | 10,000 | 20,000 | 12,436 | 10,895 | 9,105 | 2,296 |

TABLE 3-continued

|  | Stream | | | | | | |
| --- | --- | --- | --- | --- | --- | --- | --- |
|  | 300 | 301 | 302 | 303 | 304 | 305 | 306 |
| Vol. Frac. | | | | | | | |
| Propene | 0 | 1 | 0.5 | 0.0033 | 0.6131 | 0.3646 | 0.902 |
| Isobutane | 1 | 0 | 0.5 | 0.9967 | 0.3869 | 0.6354 | 0.098 |

TABLE 4

|  | Stream | | | | |
| --- | --- | --- | --- | --- | --- |
|  | 400 | 401 | 402 | 403 | 404 |
| Vap. Frac. | 0 | 1 | 0.5624 | 1 | 0 |
| Degrees F. | 100 | 23.1 | 61.1 | 61.1 | 61.1 |
| Psia | 72.2 | 72.2 | 70 | 70 | 70 |
| Lbmole/hr | 1,412 | 1,808 | 3,220 | 1,811 | 1,409 |
| Mlb/hr | 82.07 | 76.08 | 158.15 | 85.81 | 72.34 |
| Barrel/day | 10,000 | 10,000 | 20,000 | 10,945 | 9,055 |
| Vol. Frac. | | | | | |
| Propene | 0 | 1 | 0.5 | 0.6128 | 0.3636 |
| Iso-butane | 1 | 0 | 0.5 | 0.3872 | 0.6364 |

TABLE 5

|  | Stream | | | |
| --- | --- | --- | --- | --- |
|  | L5 | V6 | L6 | V7 |
| Vap. Frac. | 0.0000 | 1.0000 | 0.0000 | 1.0000 |
| Degrees F. | 87.0 | 62.0 | 62.0 | 38.7 |
| Psia | 71.0 | 71.1 | 71.1 | 71.2 |
| Lbmole/hr | 1,760 | 348 | 353 | 2,161 |
| Mlb/hr | 98.55 | 16.48 | 18.13 | 94.21 |
| Barrel/day | 12,102 | 2,102 | 2,269 | 12,269 |
| Vol. Frac. | | | | |
| Propene | 0.1324 | 0.6699 | 0.4236 | 0.9058 |
| Isobutane | 0.86761 | 0.33011 | 0.57641 | 0.0942 |

I claim:

1. A process for mixing a liquid feed stream with a higher temperature and a vapor feed stream with a lower temperature by distillation using rectification and stripping stages, the composition of the liquid feed stream being substantially different from the vapor feed stream, comprising:
   (a) an intermediate stage between a bottom stage of the rectification stages and a top stage of the stripping stages;
   (b) condensing means providing condensing duty for the rectification stages and stripping means providing stripping duty for the stripping stages;
   (c) feeding the liquid feed stream to a top rectification stage;
   (d) feeding the vapor feed stream to a bottom stripping stage; and
   (e) withdrawing substantially all the components of the feed streams in a vapor product stream from the intermediate stage and a liquid product stream from the intermediate stage.

2. The process of claim 1 wherein the liquid and vapor product streams are mixed to form a mixed product stream with a mixed product temperature substantially the same as the temperature of a stream produced by direct mixing of the feed streams.

3. The process of claim 1 wherein the condenser means comprise a single condenser cooling the liquid feed stream and a vapor stream from the top stage of the rectification stages.

4. The process of claim 1 wherein the stripping means comprise a single reboiler heating a liquid stream from the bottom stage of the stripping stages.

5. The process of claim 4 wherein the condenser means comprise a single condenser cooling the liquid feed stream and a vapor stream from the top stage of the rectification stages.

6. The process of claim 5 wherein a small portion of vapor in comparison with the vapor flow rate of the vapor feed stream is separated from an effluent from the condenser means and mixed with the product streams to form a mixed product stream.

7. The process of claim 5 wherein a small portion of liquid in comparison with the liquid flow of the liquid feed stream is withdrawn from the bottom stage of the stripping stages and mixed with the product streams to form a mixed product stream.

8. The process of claim 5 wherein the stripping stages comprise two or more theoretical stages and the rectification stages comprise two or more theoretical stages.

9. The process of claim 5 wherein the stripping stages comprise five or more theoretical stages and the rectification stages comprise two or more theoretical stages.

10. The process of claim 9 wherein the stripping stages comprise two or more theoretical stages and the rectification stages comprise five or more theoretical stages.

11. The process of claim 1 wherein the condensing means and rectification stages comprise a rectification dephlegmator process means.

12. The process of claim 11 wherein the stripping stages comprise five or more theoretical stages and the rectification stages comprise five or more theoretical stages.

13. A process for mixing a liquid feed stream with a higher temperature and a conditioned vapor feed stream with a lower temperature by distillation using rectification stages, the composition of the liquid feed stream being substantially different from the conditioned vapor feed stream, comprising:
   (a) the conditioned vapor feed stream having a minor amount of a major component of the liquid feed stream;
   (b) condensing means providing condensing duty for the rectification stages;
   (c) feeding the liquid feed stream to a top rectification stage;
   (d) feeding the conditioned vapor feed stream to a bottom rectification stage; and (e) withdrawing substantially all the components of the feed streams in a liquid product stream from a bottom rectification stage.

14. The process of claim 13 wherein the liquid product stream and the conditioned vapor feed stream are substantially in equilibrium with each other.

15. A process for mixing a conditioned liquid feed stream with a higher temperature and a vapor feed stream with a lower temperature by distillation using stripping stages, the composition of the conditioned liquid feed stream being substantially different from the vapor feed stream, comprising:

(a) the conditioned liquid feed stream having a minor amount of a major component of the vapor feed stream;

(b) stripping means providing stripping duty for the stripping stages;

(c) feeding the conditioned liquid feed stream to a top stripping stage;

(d) feeding the vapor feed stream to a bottom stripping stage; and (e) withdrawing substantially all the components of the feed streams in a vapor product stream from a top stripping stage.

16. The process of claim 15 wherein the conditioned liquid product stream and the vapor feed stream are substantially in equilibrium with each other.

* * * * *